(12) United States Patent
Mandelkau

(10) Patent No.: US 11,081,872 B2
(45) Date of Patent: Aug. 3, 2021

(54) METHOD FOR LOCALISING AN EARTH FAULT OF A FIRE PROTECTION SYSTEM

(71) Applicant: MINIMAX GMBH & CO. KG, Bad Oldesloe (DE)

(72) Inventor: Detlef Mandelkau, Bad Schwartau (DE)

(73) Assignee: Minimax GmbH & Co KG, Bad Oldesloe (DE)

( * ) Notice: Subject to any disclaimer, the term of this patent is extended or adjusted under 35 U.S.C. 154(b) by 15 days.

(21) Appl. No.: 16/607,676

(22) PCT Filed: Apr. 19, 2018

(86) PCT No.: PCT/EP2018/060050
§ 371 (c)(1),
(2) Date: Oct. 23, 2019

(87) PCT Pub. No.: WO2018/197332
PCT Pub. Date: Jan. 11, 2018

(65) Prior Publication Data
US 2020/0194992 A1    Jun. 18, 2020

(30) Foreign Application Priority Data

Apr. 25, 2017 (DE) ..................... 10 2017 108 822.9

(51) Int. Cl.
*H02M 3/00* (2006.01)
*H02H 3/16* (2006.01)
(Continued)

(52) U.S. Cl.
CPC .............. *H02H 3/16* (2013.01); *G08B 17/06* (2013.01); *G08B 25/04* (2013.01); *H02H 1/0007* (2013.01); *H02H 3/042* (2013.01)

(58) Field of Classification Search
CPC ........ H02H 3/16; H02H 1/0007; H02H 3/042; G08B 17/06; G08B 25/04
See application file for complete search history.

(56) References Cited

U.S. PATENT DOCUMENTS 4,204,201 A * 5/1980 Williams ............... G08B 19/00
340/517
6,777,951 B2   8/2004 Marino et al.
(Continued)

FOREIGN PATENT DOCUMENTS

JP   Hei 10-75525 A   3/1998
WO  WO 97/26635 A1   7/1997

OTHER PUBLICATIONS

International Search Report (with English translation), International Application No. PCT/EP2018/060050, 6 pages (dated Aug. 6, 2018).

(Continued)

*Primary Examiner* — Adolf D Berhane
*Assistant Examiner* — Afework S Demisse
(74) *Attorney, Agent, or Firm* — Perkins Coie LLP

(57) ABSTRACT

The invention proposes a method for localizing a ground fault of a fire protection system and also a fire alarm and/or extinguishing control panel comprising a plurality of connection points, a central unit and a ground fault identification module, wherein one or more subscribers can be connected to each connection point via a connection line. The method comprises, during or after identification of a ground fault by the ground fault identification module, the following steps: disconnecting the connection lines of one, more or all of the connection points by opening switching elements until at least no ground fault is identified by the ground fault identification module, and then connecting the connection (Continued)

lines successively for each connection point by closing the respective switching element.

11 Claims, 3 Drawing Sheets

(51) Int. Cl.
    *G08B 17/06*     (2006.01)
    *G08B 25/04*     (2006.01)
    *H02H 1/00*     (2006.01)
    *H02H 3/04*     (2006.01)

(56) References Cited

U.S. PATENT DOCUMENTS

| | | | |
|---|---|---|---|
| 2003/0097188 A1* | 5/2003 | O'Mahoney | G08B 25/04 700/17 |
| 2005/0097571 A1 | 5/2005 | Uguccioni | |
| 2005/0180069 A1* | 8/2005 | Tchernobrivets | H02H 3/162 361/46 |
| 2011/0025341 A1 | 2/2011 | Lupaczyk et al. | |
| 2014/0091807 A1* | 4/2014 | Lontka | H04B 3/46 324/509 |
| 2015/0097571 A1 | 4/2015 | Wei et al. | |

OTHER PUBLICATIONS

Written Opinion (with English translation), International Application No. PCT/EP2018/060050, 11 pages (dated Aug. 6, 2018).

\* cited by examiner

Fig. 2

METHOD FOR LOCALISING AN EARTH FAULT OF A FIRE PROTECTION SYSTEM

PRIORITY CLAIM AND INCORPORATION BY REFERENCE

This application is a 35 U.S.C. § 371 application of International Application No. PCT/EP2018/060050, filed Apr. 19, 2018, which claims the benefit of German Application No. 10 2017 108 822.9 filed Apr. 25, 2017, each of which is incorporated by reference in its entirety.

TECHNICAL FIELD

The following invention relates to a method for localizing a ground fault of a fire protection system, in particular of a fire protection system with a fire alarm and/or extinguishing control panel, and also to a fire alarm and/or extinguishing control panel.

BACKGROUND AND SUMMARY OF THE INVENTION

Ground fault identification modules in fire alarm and/or extinguishing control panels are known. Fire alarm and/or extinguishing control panels commonly have a plurality of connection points to which subscribers, for example fire detectors, extinguishing system components such as valves and/or alarm means, can be connected via connection lines.

If a ground fault occurs, for example, in a connection line, it is difficult to determine the location of the ground fault when there are a large number of connection lines to subscribers. When the ground fault identification module detects a ground fault in one of the subscriber lines, such as limit value lines and/or loop lines of subscribers for example, a complicated manual method for determining the location of the ground fault is required. It is customary for the ground fault identification module to display identification of a ground fault on a display unit of the fire alarm and/or extinguishing control panel.

In order to locate a ground fault, it has been necessary to date in particular to open the fire alarm and/or extinguishing control panel, to disconnect the connection lines, which lead to the subscribers, by hand and to determine for each connection line individually whether there is a ground fault or not.

According to the known methods, it is therefore necessary for an engineer to be on site, open the fire alarm and/or extinguishing control panel and disconnect connection lines to the subscribers from the connection points and also then reattach said connection lines in order to reestablish the operability. Firstly, this entails high costs owing to the high expenditure on personnel required. Furthermore, the operability of the fire alarm and extinguishing control panel is reestablished only after an unsatisfactorily long time since the engineer has to be assigned, travel and then manually remove the cables and then reconnect said cables. Finally, susceptibility to faults, for example on account of incorrect connection, is also increased on account of an engineer having to physically disconnect the connection lines from the connection points and then reattach said connection lines.

Various methods for short-circuit identification are known, for example, from U.S. Pat. No. 6,777,951. Said document discloses addressable electronics switches which are arranged in strategic locations of the interrogation loop and which are individually controlled by the system controller to disconnect the respective branch from the rest of the interrogation loop and, respectively, to connect said branch thereto in order to localize a region with problems and to isolate said region from the rest of the interrogation loop. Whereas the systems are suitable for identifying short circuits, identification of ground faults however is not possible because this is prevented by the return line which cannot be interrupted.

Against this background, the object of the present invention was therefore to improve the localization of a ground fault of a fire protection system.

According to the invention, this object is achieved by a method for localizing a ground fault of a fire protection system. The fire protection system has a fire alarm and/or extinguishing control panel. The fire alarm and/or extinguishing control panel comprises a plurality of connection points, a central unit and a ground fault identification module. One or more subscribers can be connected to each connection point. In particular, any forms and combinations of signal emitters, switch monitoring apparatuses, actuators, alarm means such as horns or lamps, fire detectors, extinguishing components but also one or more external devices and/or an external voltage supply are conceivable as subscribers. Each connection point has a switching element for electrically connecting and/or disconnecting the connection line to the and, respectively, from the connection point and has a computer unit for actuating the switching element. The ground fault identification module is connected between a ground potential and an internal interface of a computer unit of the central unit. The method comprises, during or after identification of a ground fault by the ground fault identification module, the following steps: disconnecting the connection lines of one, more or all of the connection points by opening the switching elements until at least no ground fault is identified by the ground fault identification module, and then connecting the connection lines successively for each module by closing the respective switching element.

The respective switching elements are closed in an operating state, so that the fire protection system is electrically connected to the connection lines. Opening the switching elements corresponds to disconnecting the connection line from the associated connection pair. The computer unit for actuating the respective switching element can be formed separately or as part of the computer unit of the central unit.

The connection points are preferably designed in connection pairs, wherein one connection line can then be connected to one connection pair. In this case, a common switching element can be provided for the connection pair.

The connection lines of each connection point can be disconnected and, respectively, connected to the connection point by the switching element of each connection point or connection pair, without the fire alarm and/or extinguishing control panel having to be opened and the lines having to be disconnected and, respectively, connected by the engineer by hand. Since the method involves successive connection of the connection lines for each connection point, a ground fault can be assigned precisely to that connection line which is associated with the connection point whose associated switching element was closed before the ground fault is detected by the ground fault identification module. The method can be executed automatically or from a remote position, and therefore the presence of the engineer at the site of the fire alarm and/or extinguishing control panel is not absolutely necessary.

Not every subscriber can be connected to every connection point, and therefore there can be specific associated subscribers, such as, for example, either fire detectors, signal components, such as, for example, optical or acoustic alarm means and/or extinguishing components, for example tripping apparatuses for extinguishing systems such as valves or monitoring means for extinguishing system components, but also other subscribers such as display and/or input units, for specific connection points in various embodiments. However, conversely, a plurality of different subscriber types can also be connectable to a single connection line. The connection lines are preferably two-wire lines, but the connection line can also have a plurality of lines in other embodiments. The connection lines can comprise, for example, one or more ring bus lines, control lines, limit value lines and/or external voltage supply lines, wherein all further conceivable types of connection lines can also be used.

The solution according to the invention therefore provides a method by way of which ground faults can be reliably localized using just one ground fault identification module in a plurality of connection lines even of different configuration, for example ring bus line, control line and limit value line.

Initially, during or after identification of a ground fault by the ground fault identification module, the connection lines of all of the connection points are preferably disconnected by opening the switching elements.

After all of the switching elements are opened, it is ensured that no ground fault will be detected by the ground fault identification module since any ground faults which may be present are decoupled in all of the possible connection lines owing to the disconnection of the connection lines from the connection points. Therefore, it is possible to ensure within an extremely short time that no ground fault can potentially lead to damage to the fire protection device. As already stated, common switching elements can be provided for in each case one pair of connection points in the case of connection points which are arranged in pairs.

If a ground fault is identified by the ground fault identification module even though all of the switching elements are open, the ground fault identification module is preferably designed to identify that the ground fault is present within a housing of the fire alarm and/or extinguishing control panel.

The method preferably further comprises localizing a connection line containing a ground fault as the connection line connected last as soon as the ground fault identification module identifies a ground fault once again.

If the ground fault identification module does not detect a ground fault after the switching elements have been opened, the switching elements of the connection points are preferably successively closed until the ground fault identification module detects a ground fault once again. Since closing is performed successively, the switching element which was closed last is the switching element which, when closed, renders the ground fault identifiable. The ground fault is accordingly present in the associated connection line.

The ground fault identification module preferably identifies a ground fault during the connection of one of the connection lines by closing the associated one of the switching elements. The method then further involves said switching element being opened again. The method then continues, in particular, with the connection of the further connection lines by closing the further switching elements.

Although the ground fault identification module can detect a ground fault, it cannot directly detect which of the connection lines the ground fault is present in. The ground fault identification module also cannot identify whether one, two or even an even larger number of ground faults is/are present in different connection lines. Since the switching element for which it was previously established that it, when closed, renders a ground fault identifiable, that is to say its connection line which was closed as a result exhibits a ground fault, is opened again, it is ensured that the ground fault identification module is not detecting a ground fault once again and therefore is capable of detecting a further ground fault of one of the further connection lines. In other words, before closing one of the switch elements, it is ensured that the ground fault identification module is not detecting a ground fault, so that a ground fault which is triggered by closing the switching element can be assigned to the switching element which was closed immediately before said ground fault was triggered.

The disconnection and/or connection of connection lines preferably takes place by way of an input into a display and operator control unit and/or an item of external diagnosis hardware. In one embodiment, the display and operator control unit is integrated in the fire alarm and/or extinguishing control panel. In this case, the disconnection and/or connection of connection lines or the opening/closing of switching elements is preferably implemented by interaction with the display and operator control unit. As an alternative or in addition, the state of the switching elements, specifically whether they are open or closed, can be displayed on the display unit.

In comparison to releasing and connecting connection lines by hand, an input into the display and operator control unit is possible more quickly and with less susceptibility to faults. In another embodiment, an item of external diagnosis hardware is used for input purposes in order to implement the disconnection and, respectively, connection of connection lines. The item of external diagnosis hardware preferably comprises a PC, a laptop, a tablet, a smartphone or a similar suitable apparatus which can be connected to the fire alarm and/or extinguishing control panel via a wired or wireless connection. Control of the fire alarm and/or extinguishing control panel and execution of the method for localizing a ground fault can therefore also be carried out remotely from the fire alarm and/or extinguishing control panel, for example by way of the fire alarm and/or extinguishing control panel being accessed via an Internet interface, a server or the like as an external display and operator control unit.

Therefore, in one embodiment, selective disconnection and/or connection of connection lines takes place depending on the input into the display and operator control unit and/or the item of external diagnosis hardware. In this case, for example, a display which indicates a ground fault identification state of the ground fault identification module can be set up on the display and operator control unit or the item of external diagnosis hardware. In particular, connection lines can be selectively disconnected until no identified ground fault is displayed, and the connection line(s) of the ground fault or ground faults are then determined by selective connection.

In another embodiment, the disconnection and connection steps are executed in an automated manner during or after identification of a ground fault by the ground fault identification module. The execution of the method for localizing a ground fault of a fire protection device is preferably automatically executed after activation by means of the display and operator control unit and/or the item of external diagnosis hardware.

In further embodiments, the automatic execution of the method can also be deployed when a ground fault is identified, without the method being explicitly started by the user. In this case, a particular requirement of the fire protection device, such as ensuring the operational availability for example, has to be taken into account in particular. In this embodiment, the disconnection and connection steps are preferably immediately executed during or after identification of a ground fault. In this context, immediately is to be understood to mean a time period without a significant delay.

In another embodiment, execution is triggered with a delay, wherein the delay is selected to be long enough that implementation of the method and, in particular, the associated opening of the switching elements can be manually prevented before the method is executed. For example, a predefined time period in the range of from 10 seconds to 100 minutes can be present between identification of a ground fault, supply of an associated signal and automatic execution of the method, wherein this time period is of course to be understood merely as an example. The associated signal can be supplied, for example, as a warning on the display and operator control unit and/or the item of external diagnosis hardware, so that a user is immediately informed.

According to the invention, the object is further achieved by a fire alarm and/or extinguishing control panel having a plurality of connection points, a central unit and a ground fault identification module. One or more subscribers can be connected to each connection point via a connection line. Each connection point has a switching element for electrically connecting and/or disconnecting the connection line to the and, respectively, from the connection point and has a computer unit for actuating the switching element. The ground fault identification module is connected between a ground potential and an internal interface of a computer unit of the central unit. The ground fault identification module is designed to supply a ground fault signal to a control unit of the fire alarm and/or extinguishing control panel during or after identification of a ground fault in one of the connection lines of the connection points. The central unit is primed to execute the method according to the invention for localizing a ground fault in response to the ground fault signal.

The fire alarm and/or extinguishing control panel preferably comprises one or more modules which can be arranged in the fire alarm and/or extinguishing control panel, wherein each of the modules has a pair of connection points, a switching element and a module computer unit for actuating the switching element. Combinations of connection points which are configured as parts of modules and connection points which supply the internal supply voltage to external devices for example are also conceivable.

Modules preferably have more than one pair of connection points. Each of the pairs of connection points then preferably has a separate switching element. The module computer unit can be designed to actuate all of the switching elements of the module, but a plurality of computer units can also be provided in other embodiments.

A ground fault can be identified only for each line pair, so that in a case in which an external device requires more than two connection lines, for example three or more connection lines, a switching element has to be provided for each line which can be connected to a connection point.

The central unit is preferably designed to output a corresponding display on a display and operator control unit and/or an item of external diagnosis hardware before initiating the method for localizing a ground fault.

The advantages described for the method according to the invention are likewise achieved by the fire alarm and/or extinguishing control panel according to the invention. The preferred embodiments of the method according to the invention can analogously also be combined with the fire alarm and/or extinguishing control panel according to the invention.

BRIEF DESCRIPTION OF THE DRAWINGS

Further advantages of the embodiments and particular refinements are described below with reference to the appended figures.

FIG. 2 shows, schematically and by way of example, a further embodiment of the fire protection system.

MODE(S) FOR CARRYING OUT THE INVENTION

Figure 1:
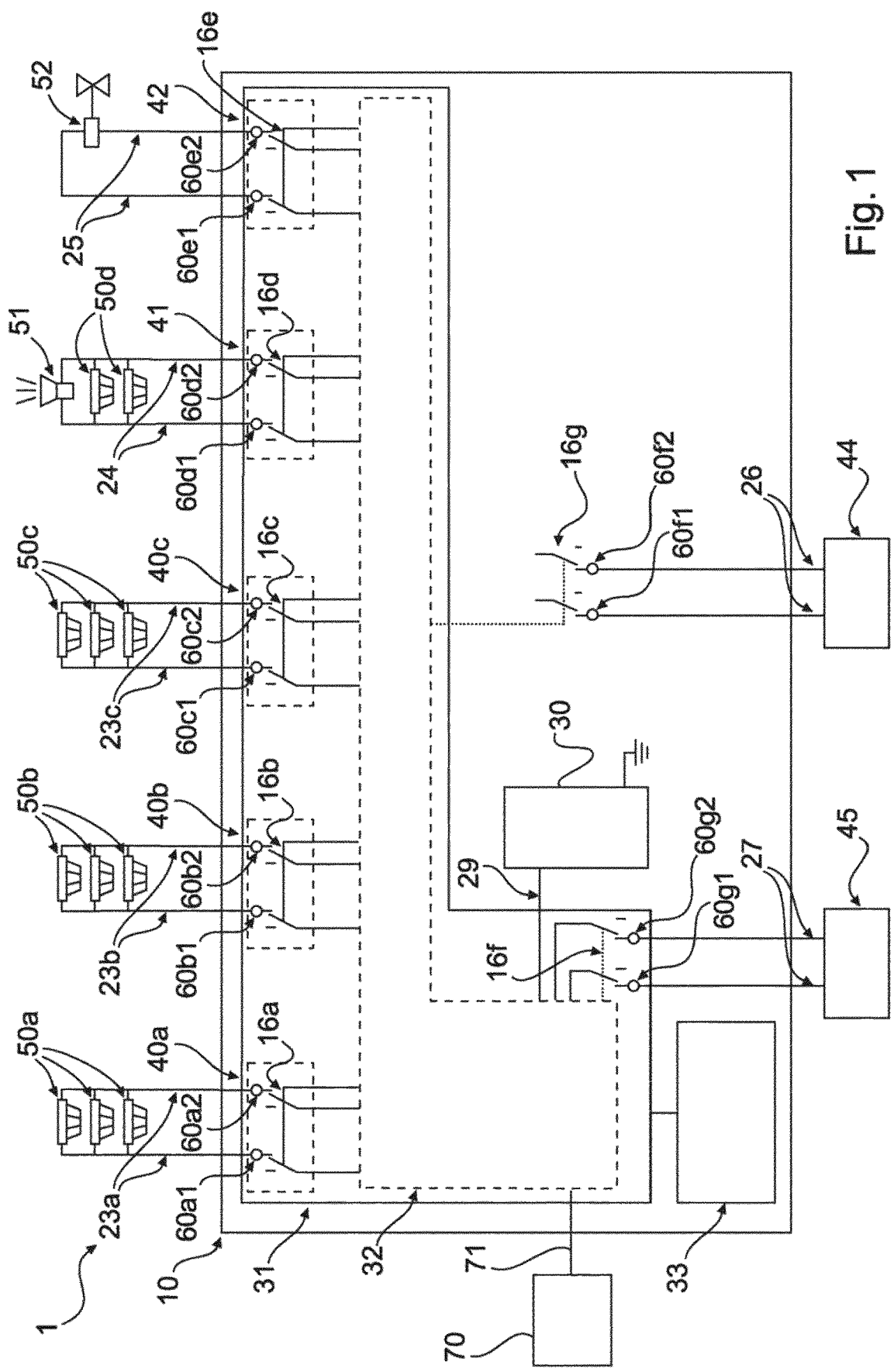
FIG. 1 shows, schematically and by way of example, a fire protection system.

FIG. 1 shows, schematically and by way of example, a fire protection system 1 which has a fire alarm and/or extinguishing control panel 10. The fire alarm and/or extinguishing control panel 10 has a plurality of electronic assemblies 40$a$ to 40$c$, 41, 42 to which one or more subscribers can be connected via a connection line 23$a$ to 23$c$, 24, 25. For connection of the connection lines 23$a$ to 23$c$, 24, 25, the electronic assemblies 40$a$ to 40$c$, 41, 42 have respective connection points 60$a$1, 60$a$2, 60$b$1, 60$b$2, 60$c$1, 60$c$2, 60$d$1, 60$d$2, 60$e$1, 60$e$2.

In this example, the electronic assemblies 40$a$ to 40$c$, 41, 42 are three state monitoring assemblies 40$a$ to 40$c$ for connection of conventional fire detectors which operate, for example, in accordance with the current increase principle, a ring bus subscriber assembly 41 for addressable fire detectors, actuators and monitoring means and also an assembly with control outputs 42. The connection lines 23$a$ to 23$c$, 24, 25 accordingly have a configuration which is matched to the respective electronic assemblies. The current increase alarm assemblies 40$a$ to 40$c$ have on their connection lines, by way of example, in each case three fire detectors 50$a$ to 50$c$. The assembly for fire detectors and actuators 41 connects two further fire detectors 50$d$ and also a horn 51 on the associated connection line 24. Finally, a valve 52, by way of example as an extinguishing system component, here for tripping an extinguishing apparatus for example, is shown on the control output assembly 42 across the associated connection line 25.

The fire detectors 50$a$ to 50$d$ can each be any desired form of known fire detector, for example spark detector, flame detector, smoke detector, combustion gas detector, aspirating smoke detector etc. and also any combination of fire detectors of this kind. The exemplary number of in each case three fire detectors 50$a$, 50$b$, 50$c$, but also the combination of a horn 51 and two fire detectors 50$d$, is to be understood as an example; any other desired combination of subscribers can likewise be implemented. In this way, a plurality of valves 52 can also be connected to the connection line 25. In general, the fire detectors 50$a$-$d$, the horn 51 and the valve 52 are examples of subscribers; any other desired combinations of all of the conceivable subscribers, for example signal emitter, switch monitoring apparatuses, actuators, alarm means, fire detectors etc. are also possible in other exemplary embodiments. The selection and distribution of the assemblies 40$a$ to 40$c$, 41, 42 shown by way of example are also to be understood as examples; other assemblies, additional assemblies or the assemblies shown can be arranged in different numbers in the fire alarm and/or extinguishing control panel 10 in other exemplary embodiments.

The fire alarm and/or extinguishing control panel 10 further has connection points 60/1, 60/2 for the connection of an external voltage supply 44 via a connection line 26 and also connection points 60g1, 60g2 for the connection of external devices 45 via a connection line 27.

Each of the connection points 60a1, 60a2, 60b1, 60b2, 60c1, 60c2, 60d1, 60d2, 60e1, 60e2, 60f1, 60f2 60g1, 60g2 is assigned a switching element 16a to 16g by way of which the connection line 23a to 23c, 24, 25, 26, 27 which is associated with the respective connection point can be electrically connected and, respectively, disconnected. In this example, the switching elements 16a to 16g are controlled by a computer unit which is integrated into a central computer unit 32 of a central unit 31. The electrical connection lines 23a to 23c, 24, 25, 26, 27 are disconnected from the central unit 31 by opening the switches 16a to 16g.

Furthermore, a display and operator control unit 33 which is integrated in the fire alarm and/or extinguishing control panel 10 is connected to the central unit 31. Control of the fire alarm and/or extinguishing control panel 10 is possible via the display and operator control unit 33 and operating parameters, for example the identification of a ground fault, are displayed on the display and operator control unit 33. Furthermore, it is possible to connect an external display and operator control unit 70 via an external interface 71. The external interface 71 can be configured, for example, in a cabled or wireless manner and render possible connection of the central unit 31 to various external display and operator control units 70. The external display and operator control unit 70 can be, for example, a tablet, a portable computer, a PC or else a web interface via a server.

The computer unit 32 is further connected to a ground fault identification module 30, which is arranged between a ground voltage and the internal voltage of the central unit 31, via an internal interface 29. The ground fault identification module 30 is designed to inform the computer unit 32 of an established ground fault via the internal interface 29. A display indicating that a ground fault has been detected is then displayed on the display and operator control unit 33 and/or external display and operator control unit 70, preferably in a manner controlled by the computer unit 32.

Figure 2:
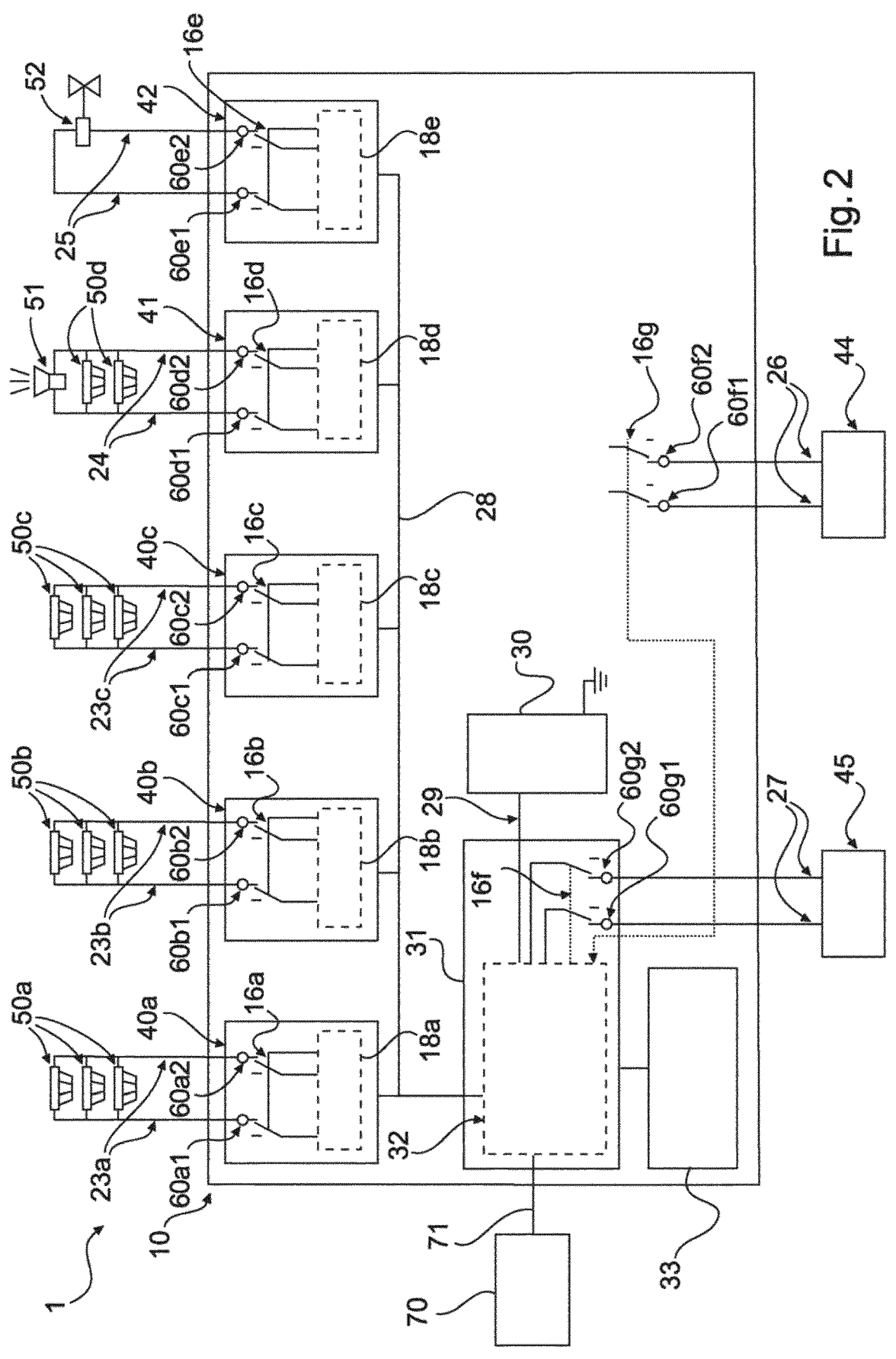

FIG. 2 shows, schematically and by way of example, an exemplary embodiment of the fire protection system 1 in which, in comparison to the embodiment shown in FIG. 1, the electronic assemblies 40a-40c, 41, 42 are designed as modules. In this case, each of the modules has one switching element 16a to 16e for in each case one pair of connection points 60a1, 60a2, 60b1, 60b2, 60c1, 60c2, 60d1, 60d2, 60e1, 60e2 and one module computer unit 18a to 18e which is provided for each module. The electrical connection lines 23a to 23c, 24, 25 are disconnected from the module computer units 18a to 18e by opening the switches 16a to 16e. Just like the electronic assemblies of FIG. 1, the modules of FIG. 2 are distinguished by a certain functionality. In addition, the modules shown in FIG. 2 are of exchangeable, in particular plug-connectable, design and therefore permit a particular flexibility of the fire alarm and/or extinguishing control panel 10.

The module computer units 18a to 18e communicate with the computer unit 32 of the central unit 31 of the fire alarm and/or extinguishing control panel 10 via a module bus 28 which can be designed as any desired known module bus. For example, the computer unit 32 can, via the module bus 28, instruct the module computer units 18a to 18e to control the switching elements 16a to 16e.

The method according to the invention for localizing a ground fault also takes place in the same way as in the case described in FIG. 1 in the case of this modular design of the fire alarm and/or extinguishing control panel 10. Combinations of modular and non-modular electronic assemblies 40a-40c, 41, 42 are likewise conceivable.

Figure 3:
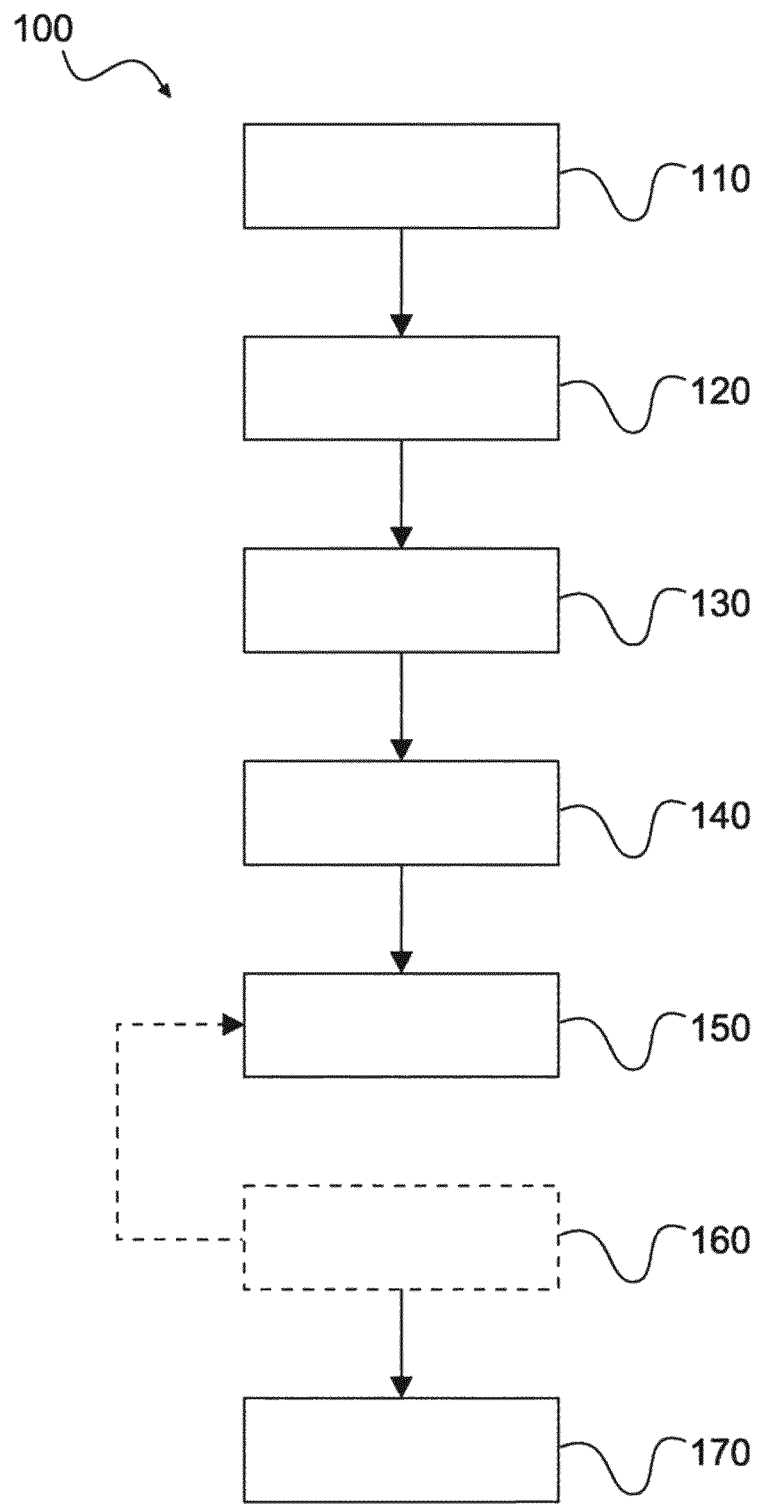
FIG. 3 shows, schematically and by way of example, a flowchart of a method for localizing a ground fault.

When the ground fault identification module 30 detects a ground fault, it is not possible to establish which of the connection lines 23a to 23c, 24, 25, 26 and 27 the ground fault is present on. The invention proposes a method 100 for localizing the detected ground fault, which method will be schematically described with reference to FIG. 3.

Firstly, a ground fault is identified by the ground fault identification module 30 in a step 110 of a method 100 for localizing a ground fault of a fire protection system 1. During normal operation, a ground fault is not present and all of the switching elements 16a to 16g are closed.

When a ground fault is identified in step 110, the electrical lines 23a-c, 24, 25, 26, 27 of the connection points, in a manner controlled by their associated computer unit 18a to 18e and, respectively, the computer unit 32 of the central unit 31, are disconnected from the module computer unit 18a to 18e and, respectively, the computer unit 32 of the central unit 31 by opening the switching elements 16a to 16g in step 120. In the case of a modular design, this can for example be signaled to all modules by the computer unit 32 of the central unit 31 via the internal module bus 28. In an alternative embodiment, all of the switching elements 16a to 16g are not automatically opened, but rather only as many are opened as is necessary for the ground fault identification module 30 to no longer identify a ground fault.

The ground fault identification module 30 then signals in step 130 that a ground fault is no longer present.

Staying with the modular exemplary embodiment, in order to localize the connection line of the ground fault, the computer unit 32 now for example informs each module computer unit 18a to 18e via the internal module bus 28 to switch on the associated switching element 16a to 16e and also the switching elements 16f and 16g in step 140. If the ground fault identification module 30 detects in a step 150 that a ground fault is present again, the computer unit 32 is informed of this via the internal interface 29. The computer unit 32 then knows which module has just been switched on by operation of the switching element 16a to 16g and can therefore localize the exact connection line.

The location of the ground fault can then be displayed on the display and operator control unit 33 and, respectively, external display and operator control unit 70 in a step 170. An engineer then only has to examine the relevant connection line when searching for the ground fault.

After a module which has a connection line which causes the ground fault has been found in step 150, the switching element 16a to 16e of the associated module and, respectively, the switching element 16f or 16g can optionally be disconnected again in a step 160. The method can then continue with closing the further switching elements in step 150, so that detection of a plurality of ground faults in a variety of the connection lines 23a to 23c, 24, 25 is also possible.

In this example, the switching elements 16f and 16g are directly controlled by the computer unit 32, the function and integration into the method 100 according to the invention takes place independently thereof in the same form as for the further switching elements 16a to 16e. As already described in detail, cf. FIG. 1, one, more or all of the switching elements 16a to 16g can also be directly controlled by the computer unit 32.

The sequence of method steps of the method 100 illustrated by way of example is not always automatically possible since object monitoring is not ensured during the time which is required for localizing the ground fault. In this case, a manual search can be carried out via the display and operator control unit 33 and, respectively, the external display and operator control unit 70, which manual search, just like in step 120, includes opening one or more of the switching elements 16a to 16g until the ground fault identification module 30 no longer establishes a ground fault. As soon as a ground fault is no longer present, it is known that the switching element 16a to 16g which was opened last is connected to the connection line which has caused the ground fault. For the purpose of identifying multiple ground faults, the procedure as described by way of example for the automatic implementation in steps 130 to 170 also has to be followed in the case of the manual method.

The two alternatives, specifically automatic and manual execution, can also be executed depending on a user input. For example, the user can select whether the automatic or manual search for the ground fault should be carried out. The criteria for this can be, for example, whether object monitoring is necessary at the current time or not.

The invention therefore relates to a method for localizing a ground fault of a fire protection system 1 and also to a fire alarm and/or extinguishing control panel 10 comprising a plurality of connection points 60a1, 60a2, 60b1, 60b2, 60c1, 60c2, 60d1, 60d2, 60e1, 60e2, 60f1, 60f2, 60g1, 60g2, a central unit 31 and a ground fault identification module 30, wherein one or more subscribers can be connected to each connection point 60a1, 60a2, 60b1, 60b2, 60c1, 60c2, 60d1, 60d2, 60e1, 60e2, 60f1, 60f2, 60g1, 60g2 via a connection line 23a-c, 24, 25, 26, 27. The method comprises, during or after identification of a ground fault by the ground fault identification module 30, the following steps: disconnecting the connection lines of one, more or all of the connection points 60a1, 60a2, 60b1, 60b2, 60c1, 60c2, 60d1, 60d2, 60e1, 60e2, 60f1, 60f2, 60g1, 60g2 by opening switching elements 16a-16g until at least no ground fault is identified by the ground fault identification module 30, and then connecting the connection lines 23a-c, 24, 25, 26, 27 successively for each connection point by closing the respective switching element 16a-16g.

LIST OF UTILIZED REFERENCE NUMBERS

1 Fire protection system
10 Fire alarm and/or extinguishing control panel
16a-16g Switching element
18a-18e Module computer unit
23a-23c Connection line
24, 25, 26, 27 Connection line
28 Module bus
29 Internal interface
30 Ground fault identification module
31 Central unit
32 Computer unit
33 Display and operator control unit
40a-40c Electronic assembly
41 Electronic assembly
42 Electronic assembly
44 External voltage supply
45 External device
50a-50d Fire detector
51 Signal component
52 Extinguishing component
60 Connection point
70 External display and operator control unit
71 External interface
100 Method for localizing a ground fault

The invention claimed is:

1. A method for localizing a ground fault of a fire protection system, wherein the fire protection system has a fire alarm and/or extinguishing control panel, wherein the fire alarm and/or extinguishing control panel comprises a plurality of connection points, a central unit and a ground fault identification module, wherein one or more subscribers can be connected to each connection point via a connection line, wherein each connection point has a switching element for electrically connecting and/or disconnecting the connection line to and, respectively, from the connection point and has a computer unit for actuating the switching element, and wherein the ground fault identification module is connected between a ground potential and an internal interface of a computer unit of the central unit, the method comprising, during or after identification of a ground fault by the ground fault identification module, the following steps:
disconnecting the connection lines of one, more or all of the connection points by opening the switching elements until at least no ground fault is identified by the ground fault identification module, and then
connecting the connection lines successively for each connection point by closing the respective switching element.

2. The method as claimed in claim 1, wherein initially, during or after identification of a ground fault by the ground fault identification module, the connection lines of all of the connection points are disconnected by opening the switching elements.

3. The method as claimed in claim 2, wherein the method further comprises:
localizing a connection line containing a ground fault as the connection line connected last as soon as the ground fault identification module identifies a ground fault once again.

4. The method as claimed in claim 3, wherein the ground fault identification module identifies a ground fault during the connection of one of the connection lines by closing the associated one of the switching elements, wherein the method then further involves said switching element being opened again, and
wherein the method continues with the connection of further connection lines by closing further switching elements.

5. The method as claimed in claim 1, wherein the disconnection and/or connection of connection lines takes place by way of an input into a display and operator control unit and/or an item of external diagnosis hardware.

6. The method as claimed in claim 5, wherein selective disconnection and/or connection of connection lines takes place depending on the input.

7. The method as claimed in claim 5, wherein the input initiates automatic execution of the disconnection and connection steps.

8. The method as claimed in claim 1, wherein the disconnection and connection steps are executed immediately during or after identification of a ground fault by the ground fault identification module.

9. A fire alarm and/or extinguishing control panel having a plurality of connection points, central unit and a ground fault identification module, wherein one or more subscribers can be connected to each connection point via a connection line, wherein each connection point has a switching element for electrically connecting and/or disconnecting the connection line to and, respectively, from the connection point and has a computer unit for actuating the switching element, wherein the ground fault identification module is connected between a ground potential and an internal interface of a computer unit of the central unit, wherein the ground fault identification module is designed to supply a ground fault signal to a control unit of the fire alarm and/or extinguishing control panel during or after identification of a ground fault in one of the connection lines of the connection points, and wherein the central unit is designed to:

disconnect the connection lines of one, more or all of the connection points by opening the switching elements until at least no ground fault is identified by the ground fault identification module, and then connect the connection lines successively for each connection point by closing the respective switching element.

10. The fire alarm and/or extinguishing control panel as claimed in claim 9, wherein one or more modules can be arranged in the fire alarm and/or extinguishing control panel, wherein each of the modules has a pair of connection points, a switching element and a module computer unit for actuating the switching element.

11. The fire alarm and/or extinguishing control panel as claimed in claim 9, wherein the central unit is designed to output a corresponding display on a display and operator control unit and/or an item of external diagnosis hardware before initiating the method for localizing a ground fault.

\* \* \* \* \*